United States Patent
Xu et al.

(10) Patent No.: US 9,274,665 B2
(45) Date of Patent: Mar. 1, 2016

(54) TOUCH DETECTING METHOD AND TOUCH DETECTING APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Shuai Xu, Beijing (CN); Yao Yu, Beijing (CN); Zhengxin Zhang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 164 days.

(21) Appl. No.: 14/345,788

(22) PCT Filed: May 2, 2013

(86) PCT No.: PCT/CN2013/075076
§ 371 (c)(1),
(2) Date: Mar. 19, 2014

(87) PCT Pub. No.: WO2014/134863
PCT Pub. Date: Sep. 12, 2014

(65) Prior Publication Data
US 2015/0378469 A1    Dec. 31, 2015

(30) Foreign Application Priority Data
Mar. 5, 2013    (CN) .......................... 2013 1 0069018

(51) Int. Cl.
G06F 3/041    (2006.01)
G06F 3/044    (2006.01)
G09G 3/20    (2006.01)

(52) U.S. Cl.
CPC .............. *G06F 3/044* (2013.01); *G06F 3/0416* (2013.01); *G09G 3/20* (2013.01)

(58) Field of Classification Search
CPC .................. G06F 3/041–3/047; G06F 3/0416; G06F 1/3262
USPC .................................................. 345/173–184
See application file for complete search history.

(56) References Cited

U.S. PATENT DOCUMENTS

2010/0289758 A1    11/2010    Matsubara
2012/0169660 A1    7/2012    Seo
2012/0262391 A1    10/2012    Maki et al.

FOREIGN PATENT DOCUMENTS

CN    101615097 A    12/2009
CN    101644980 A    2/2010

(Continued)

OTHER PUBLICATIONS

Written Opinion of the International Searching Authority dated Nov. 29, 2013; PCT/CN2013/075076.

(Continued)

*Primary Examiner* — Larry Sternbane
(74) *Attorney, Agent, or Firm* — Ladas & Parry LLP (57) ABSTRACT

The embodiments of the present invention provide a touch detecting method and a touch detecting apparatus. The touch detecting method may include: dividing a plurality of detecting rows in a touch screen into row groups; determining a selected detecting row in each row group; performing a primary touch detecting on pixel points in each detecting row in each row group, wherein the touch detecting on the pixel points in the same pixel column in the same row group is performed synchronously; upon there being a pixel column existing touch feedback in any row group, performing a subsidiary touch detecting on the pixel points in the selected detecting row in the pixel column, to determine the pixel point being touched. The touch detecting method and touch detecting apparatus according to the embodiments may solve problems of responding slowly, halting, or not responding caused by too many touch detecting times in the prior art.

18 Claims, 7 Drawing Sheets

(56) References Cited

FOREIGN PATENT DOCUMENTS

| CN | 102012765 A | 4/2011 |
| CN | 102681715 A | 9/2012 |
| CN | 102880368 A | 1/2013 |

OTHER PUBLICATIONS

First Chinese Office Action dated Jul. 3, 2015; Appln. No. 201310069018.2.

TOUCH DETECTING METHOD AND TOUCH DETECTING APPARATUS

FIELD OF THE INVENTION

Embodiments of the present invention relate to a touch detecting method and a touch detecting apparatus.

BACKGROUND

Currently, the existing touch screen detecting manners comprise: resistance type touch detecting manner, capacitance type touch detecting manner, infrared touch detecting manner, sound surface wave touch detecting manner, electromagnetic touch detecting manner and so on. The touch screens in mobile devices such as a mobile phone, a tablet PC, etc. commonly use the resistance type and the capacitance type technologies. In the resistance type technology, the touch panel is covered with two layers of Indium Tin oxide (ITO). When the touch panel using the resistance type technology is touched, the two ITO layers make contact with each other, so that a switch corresponding to the touch position is turned on, and corresponding information is transferred to the processor for further processing. In the capacitance type technology, the touch panel is covered with a material which can store charge. Upon the touch panel using the capacitance type technology being touched, a small amount of charges are attracted to the touch point, and the circuit in the touch panel measures the charges attracted to the touch point, and transfers the corresponding information to the processor for processing.

The above touch screen technologies both use a line sequence scanning manner to detect touch, store a change of the touch sensor (that is, the touch panel) into the processor, and the processor converts the change of the touch sensor into a corresponding coordinate on the display screen, and the system performs user's operation according to the position of the corresponding coordinate.

Figure 1:
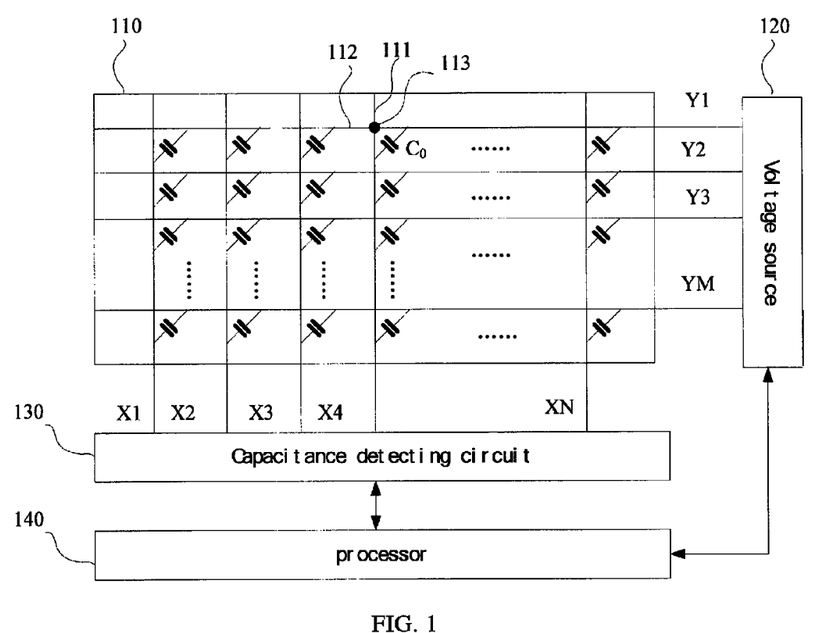
FIG. 1 is a block view of a capacitance type touch screen system.
Figure 2:
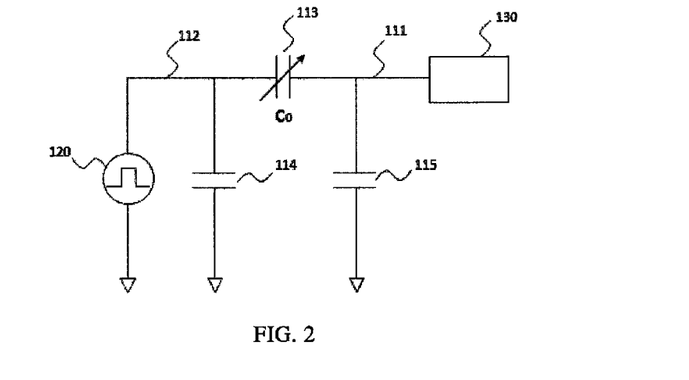
FIG. 2 is a simplified schematic view of a mutual capacitance circuit.

FIG. 1 is a block view of a capacitance type touch screen system. FIG. 2 is a simplified schematic view of a mutual capacitance circuit. The mutual capacitance circuit comprises a sensing line 111, a driving line 112, and a capacitance coupling node 113 (that is, detecting unit $C_0$), wherein the sensing line 111 and the driving line 112 are separated spatially. The driving line 112 is connected between the voltage source 120 and the capacitance coupling node 113, to transfer driving signal to the capacitance coupling node 113. The sensing line 111 is connected between the capacitance coupling node 113 and the capacitance detecting circuit 130, to transfer the detecting signal of the capacitance coupling node 113 to the capacitance detecting circuit 130. 114 and 115 are parasitic capacitance generated between the coating layers of the touch panel.

The touch detecting process will be described below by taking the capacitance coupling node 113 as an example.

Upon the capacitance coupling node 113 being not touched, the charges on the capacitance coupling node 113 remain constant. Upon the capacitance coupling node 113 being touched, the charges carried by the detecting unit $C_0$ changes, and at this time, the detecting signal that the charges have changed is transferred to the capacitance detecting circuit 130 by the sensing line. The capacitance detecting circuit records the position information of the capacitance coupling node 113 where charges have changed, and sends the recording result to the processor, to make the processor perform corresponding operation.

Figure 3:
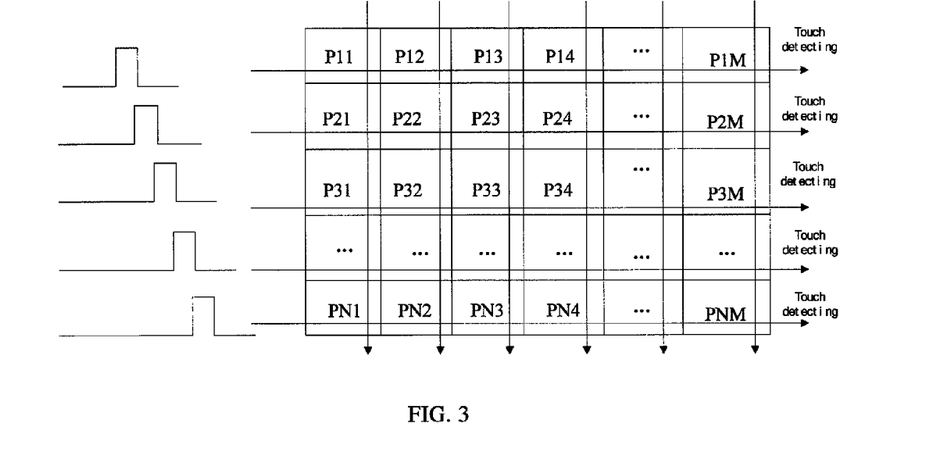
FIG. 3 is a schematic view of a conventional touch screen detecting method.

FIG. 3 is a schematic view of a detecting method of a conventional touch screen, in which touch scanning is performed sequentially on each pixel point in each row, and the processor detects and records the scanning result. With respect to a touch screen with a resolution of M×N (that is, in the touch screen, the total row number of pixel points is N, and the total column number is M, wherein M and N are positive integers), if the touch screen detecting is performed by using the conventional touch screen detecting method, it totally needs to perform M×N times of detecting.

Figure 4:
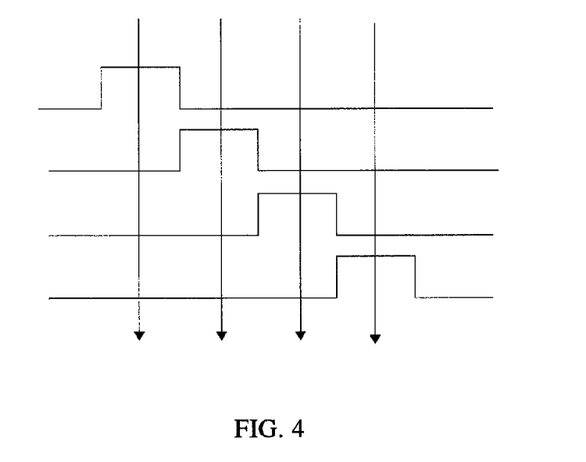
FIG. 4 is a schematic view of the driving signal which is input to the capacitance coupling node in each row through driving lines by the voltage source in the conventional touch screen detecting method.

FIG. 4 is a schematic view of the driving signal which is input to the capacitance coupling node in each row through driving lines by the voltage source 120 when using the method corresponding to FIG. 3. When a first period arrives, the driving signal is input to the first row, to make the detecting circuit sequentially performing detecting on pixel points (that is, the capacitance coupling nodes) in the first row. When a second period arrives, the driving signal is input to the capacitance coupling nodes in the second row, to make the detecting circuit sequentially performing detecting on the capacitance coupling nodes in the second row. In the same way, when the nth period arrives, it performs detecting on the capacitance coupling nodes in the nth row, wherein N is the number of the rows of the touch screen.

It can be seen from the above analysis that as the resolution of the touch screen increases, the detecting times of the processor increase by several times, and the requirement on the calculating speed of the processor is higher, and once the calculating speed of the processor cannot be improved to a corresponding level in a short period, the apparatus would occur the cases of responding slowly, halting, or not responding (for example, system halted).

SUMMARY

Embodiments of the present invention provide a touch detecting method and a touch detecting apparatus, which can solve the problems of responding slowly, halting, or not responding caused by too many detecting times in the prior art.

According to one aspect of the present invention, there is provided a touch detecting method, comprising:

dividing a plurality of detecting rows in a touch screen into row groups;

determining a selected detecting row in each row group;

performing a primary touch detecting on pixel points in each detecting row in each row group, wherein the touch detecting on the pixel points in a same pixel column in a same row group is performed synchronously; and upon a pixel column having touch feedback is detected being any row group, performing a subsidiary touch detecting on the pixel points in the selected detecting row in the above pixel column, to determine the pixel point being touched.

The embodiment of the present invention further provides a touch detecting apparatus, comprising:

a dividing module, configured to divide a plurality of rows in a touch screen into row groups;

a selecting module, configured to determine a selected detecting row in each row group; and a detecting module, configured to perform a primary touch detecting on pixel points in each detecting row in each row group, wherein the touch detecting on the pixel points in a same pixel column in a same row group is performed synchronously; upon a pixel column existing touch feedback being detected in any row group, perform a subsidiary touch detecting on the pixel points in the selected detecting row in the above pixel column, to determine the pixel point being touched.

Compared with the conventional method in which touch detecting is performed sequentially on each pixel point, the touch detecting method and apparatus according to the embodiments of the present invention reduce detecting times, effectively lower the requirement on calculating speed of the processor of the touch screen, shorten the total time of touch detecting, improve responding speed, and solve problems of responding slowly, halting, or not responding caused by too many touch detecting times.

DETAILED DESCRIPTION

In the touch detecting method and apparatus provided by the embodiments of the present invention, a plurality of detecting rows in a touch screen are divided into row groups, and the touch detecting is performed synchronously on the detecting rows in each row group, and when it is determined that there is a pixel column existing touch feedback in a certain row group (that is, a pixel point is being touched, and the charges carried by the capacitance at the position or the resistance value of the resistance at the position etc. change, to generate a feedback signal), a touch detecting is performed on the pixel points in the selected detecting row in the pixel column, so as to determine the pixel point being touched. Compared with the conventional method in which touch detecting is performed sequentially on each pixel point, the touch detecting method and apparatus according to the embodiments of the present invention may reduce detecting times, so as to effectively lower the requirement on calculating speed of the processor of the touch screen, shorten the total time of touch detecting, improve responding speed, and solve problems of responding slowly, halting, or not responding caused by too many touch detecting times.

The preferred embodiments of the present invention will be described below in connection with the figures.

Figure 5:
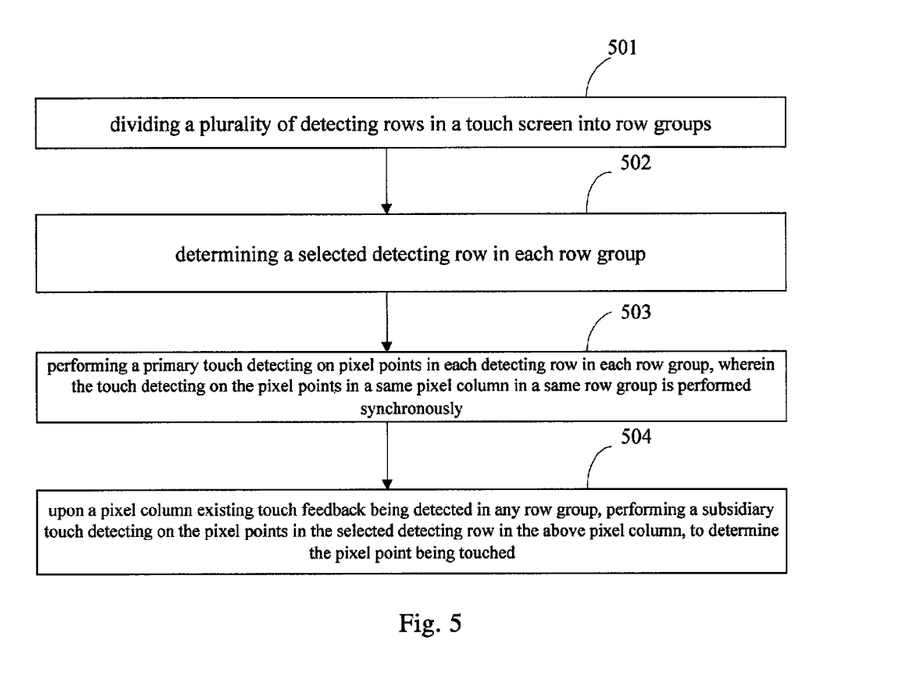
FIG. 5 is a schematic view of a touch detecting method according to an embodiment of the present invention.

An embodiment of the present invention provides a touch detecting method, and as illustrated in FIG. 5, the method may comprise:

Step 501: dividing a plurality of detecting rows in a touch screen into row groups.

Assuming that the resolution of the touch screen is M×N, the touch screen has N detecting rows. When performing the row group division, it may use the following dividing manners but not limited to it:

Every two rows in the touch screen are divided as one row group, or every three rows are divided as one row group, or every four rows are divided as one row group, or a dividing manner, in which the numbers of detecting rows in different row group are not all identical, is adopted. The detailed row group dividing manner may be selected according to actual demands, and a plurality of row groups, in which the numbers of the detecting rows are not identical, may be divided.

Step 502: determining a selected detecting row in each row group.

In actual applications, a selected row is determined from each row group as required, and the other detecting rows except the selected detecting row are taken as non-selected rows, wherein:

when it is determined that there is only one detecting row in any row group after division, the detecting row may be directly taken as the non-selected detecting row, and there is no selected detecting row in this row group;

when it is determined that there is N detecting rows in any row group after division, N−1 detecting rows are selected from the N detecting rows as the selected detecting rows, and the remaining one detecting row is taken as non-selected detecting row.

In actual applications since the number of the non-selected detecting row in each row group is generally 1, the remaining detecting rows may be taken as the determined selected detecting rows after selecting the non-selected detecting row from each row group. For example, the first detecting row in each row group may be taken as the non-selected detecting row, or the last detecting row in each row group may also be taken as the non-selected detecting row. Detecting rows at different relative positions with respect to different row groups may also be taken as the non-selected detecting row, for example, the first detecting row in the first row group is taken as the non-selected detecting row, the third detecting row in the second row group is taken as the non-selected detecting row, and the first detecting row in the third row group is taken as the non-selected detecting row.

Step 503: performing a primary touch detecting on pixel points in each detecting row in each row group, wherein the touch detecting on the pixel points in the same pixel column in the same row group is performed synchronously, that is, all pixel points located in the same pixel column in the same row group may be detected by one detecting.

In actual applications, the step 503 is the touch detecting process at the primary detecting stage in the embodiment of the present invention, and the process may comprise:

inputting driving signals to each detecting row in each row group sequentially;

according to the feedback information of the row groups which have received driving signals, performing touch detecting on each pixel point in each detecting row of the above row groups which have received driving signals.

In actual applications, a corresponding feedback information may generally be generated with respect to the row groups, which have received driving signals, by a detecting circuit, and the feedback information may comprise but not limited thereto: the detecting rows comprised by the row groups receiving driving signals are which rows, the selected detecting rows are which rows, and the number of the pixel points comprised by each detecting row, and some other information.

Step 504: upon a pixel column existing touch feedback being detected in any row group, performing a subsidiary touch detecting on the pixel points in the selected detecting row in the above pixel column, to determine the pixel point being touched.

Since when the pixel point is being touched, the charge of the capacitance at the position or the resistance value of the resistance at the position may change, and thus generate a corresponding feedback signal, and the generated feedback signal is transferred to the processor. Upon performing the primary detecting on any row group, if the pixel point in a certain row group is touched, the processor will receive the feedback signal of the pixel point being touched at this time. Since the touch detecting on the pixel points in the same pixel column in the same row group is synchronous, at this time, what the processor records is which column of which row group is being detected, and thus, it can not be determined that the feedback signal is particularly feedback by which pixel point in the column in the row group being detected, and at this time, it needs to enter the subsidiary detecting stage to determine the touched pixel point.

The step 504 is a touch detecting process of the subsidiary detecting stage in the embodiment of the present invention, and the detailed process of performing touch detecting on the pixel points in the selected detecting row in the pixel column may be as follows:

if the number of the selected detecting row of the above any row group is 1, in a preset time length after inputting driving signals to each detecting row in the above any row group, inputting the driving signal to the selected detecting row of the above any row group (optionally, the ratio of the time length, during which driving signals are inputted to each detecting row in the above any row group, and the preset time length may be the same as the number of the selected detecting rows in the above any row group, for example, if it is started form 10:00:00, it lasts one second to input the driving signal to each detecting row in the above any row group, and in one second after that, the driving signal is inputted to the selected detecting row of the above any row group);

if the number of the selected detecting row of the above any row group is greater than 1, in a preset time length after inputting driving signals to each detecting row in the above any row group, sequentially inputting the driving signals to the selected detecting rows of the above any row group (for example, upon the above any row group having three detecting rows, if it is started form 10:00:00, it lasts one second to input the driving signal to each detecting row in the above any row group, and from 10:00:01 to 10:00:02, the driving signal is inputted to one selected detecting row of the above any row group, and from 10:00:02 to 10:00:03, the driving signal is inputted to another selected detecting row of the above any row group);

performing touch detecting on the pixel points in the selected detecting row having received the driving signal in the above pixel column.

The detailed process of determining the touched pixel point according to the detecting results of the subsidiary detecting stage may be as follows:

when it is determined that there exist touch feedback at a pixel point in any selected detecting row in the above pixel column, the above pixel point is determined as the touched pixel point;

when it is determined that there does not exist touch feedback at a pixel point in any selected detecting row in the above pixel column (i.e. the pixel point is not touched, the charge carried by the capacitance at the position or the resistance value of the resistance at the position etc. do not change) or there does not exist the selected detecting row in the above any row group, the pixel point located in the non-selected detecting row of the above pixel column in the above any row group is determined as the touched pixel point.

In actual applications, when performing primary detecting on a certain row group, if it is determined that there is pixel column having touch feedback in the row group, the pixel points located in the pixel column of the row group may be first stored temporarily, that is, the processor records the primary detecting result detected currently of the pixel point in the pixel column of the row group as existing touch, then go to the subsidiary detecting stage, and sequentially perform the subsidiary detecting on the pixel points in the selected detecting rows in the pixel column of the row group.

The touch detecting manner used by the embodiments of the present invention may adopt any one of the following manners but not limited to it: resistance type touch detecting manner, capacitance type touch detecting manner, infrared touch detecting manner, sound surface wave touch detecting manner, and electromagnetic touch detecting manner.

In the above embodiments, if the resolution of the touch screen is 10000×5000 (that is, there is 10000 columns and 5000 rows), the touch screen is divided into 2500 row groups at this time, wherein the first row and the second row are divided into one row group, the third row and the fourth row are divided into one row group, . . . , the 4999th row and the 5000th row are divided into one row group, at this time, the touch detecting times is 0.5×10000×5000+1=25000001, which is reduced by approximately one half of the touch detecting times (10000×5000) of the conventional detecting manner.

If the resolution of the touch screen is 10000×5999 (that is, there is 10000 columns and 5999 rows), the touch screen is divided into 2000 row groups at this time, wherein the first row, the second row and the third row are divided into one row group, the fourth row, the fifth row and the sixth row are divided into one row group, . . . , the 5995th row, the 5996th and the 5997th row are divided into one row group, the 5998th row and the 5999th row are divided into one row group, at this time, if the touch pixel point exists in the last row group, the touch detecting times is 10000×2000+1, if the touch pixel point exists in other row group, the touch detecting times is 10000×2000+2, obviously, this is reduced by approximately two third of the touch detecting times (10000×5999) of the conventional detecting manner, which may greatly reduce the detecting time length.

Figure 6A:
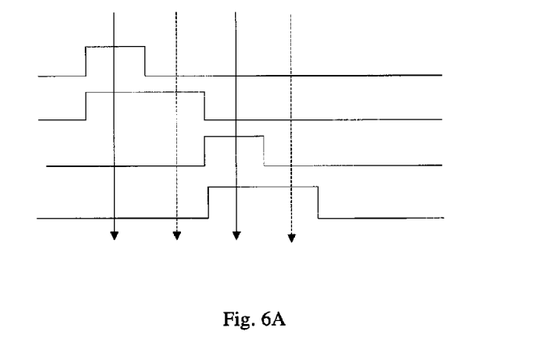
FIG. 6A is a sequence chart of driving signals of the touch detecting method according to the embodiment of the present invention.

FIG. 6A is a sequence chart of driving signals of the touch detecting method according to the embodiment of the present invention, wherein two detecting rows are one row group. In the primary detecting stage in FIG. 6A, the touch detecting is performed synchronously on the pixel points located at the same pixel column in the first and second rows, the touch detecting is performed synchronously on the pixel points located at the same pixel column in the third and fourth rows, and the touch detecting is performed synchronously on the pixel points located at the same pixel column in the fifth and sixth rows, and so on, to perform touch detecting on the whole touch screen.

In the process of performing touch detecting in FIG. 6A, a voltage source may input a primary detecting driving signal to the first row and the second row in the first period, input a subsidiary detecting driving signal into the second row in the second period, . . . , input a primary detecting driving signal to the (N−1)th row and the Nth row in the (N−1)th period, and input a subsidiary detecting driving signal into the Nth row in the Nth period, . . . , and the detecting circuit may perform synchronal primary detecting on the pixel points in the first and second rows in the first period, if the results of the primary detecting indicate that there exist touch at the pixel points in the Mth column, a subsidiary detecting is performing on the pixel point at the Mth column and the second row, wherein M is a positive integer greater than 0.

When performing the primary detecting on two rows synchronously, the detecting circuit may perform the primary detecting synchronously on the points located in the same pixel column in each row, for example, a touch detecting is performed synchronously on the pixel point at the first row and the first column and the pixel point at the second row and the first column, and a touch detecting is performed synchronously on the pixel point at the first row and the second column and the pixel point at the second row and the second column, etc.

If it is determined that the primary detecting result of any row group indicates that the pixel point in certain pixel column is touched, a subsidiary detecting is performed on the pixel points located in the selected detecting row in the pixel column, and judge whether the pixel point located the selected detecting row in the pixel column is touched or not, if it is touched, then judge that the pixel point located in the selected detecting row in the pixel column is touched, if not, then judge that the pixel point located in the non-selected detecting row in the pixel column is touched.

Figure 6B:
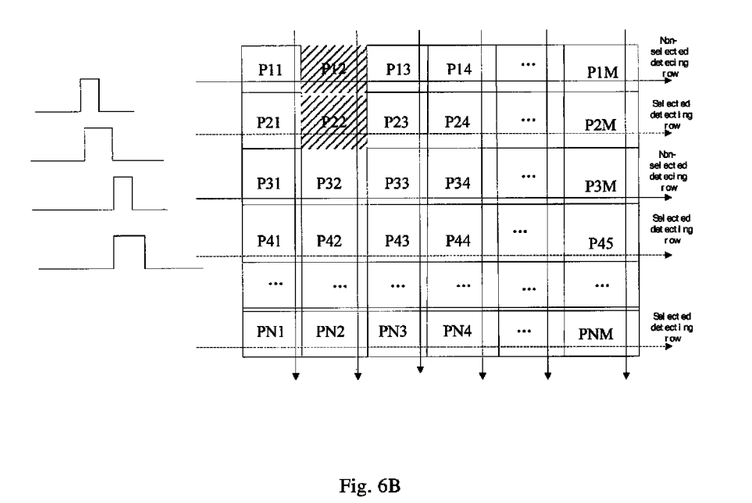
FIG. 6B is a schematic view of results after performing primary detecting in the embodiment of the present invention.

For example, the primary detecting is performed on the first row and the second row synchronously, if the detecting result indicates that the pixel point in the second column is touched, that is P12 and P22 both might be touched, then a detecting is performed on the P22 in the second row. If the detecting result of P22 indicates that it has been touched, then P22 is determined as the touched pixel point, and if the detecting result of P22 indicates that it has not been touched, then P12 is determined as the touched pixel point. FIG. 6B is a schematic view of results after performing primary detecting in the embodiment of the present invention, and FIG. 6C is a schematic view of performing a subsidiary detecting in the embodiment of the present invention.

Figures 6C, 7:
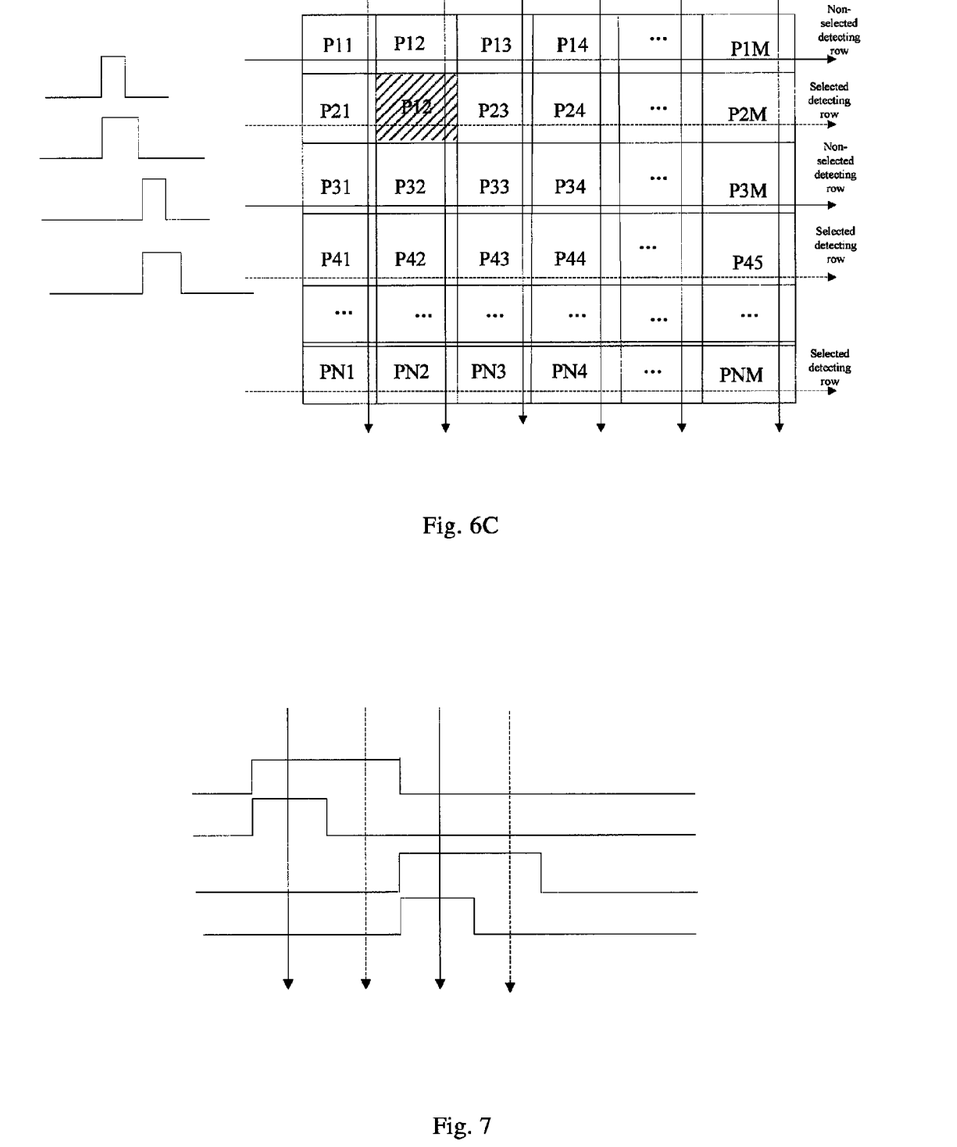
FIG. 6C is a schematic view of performing a subsidiary detecting in the embodiment of the present invention.
FIG. 7 is a sequence chart of driving signals of a touch detecting method according to another embodiment of the present invention, wherein each row group comprises two detecting rows.

FIG. 7 is a sequence chart of driving signals of a touch detecting method according to another embodiment of the present invention, wherein two detecting rows is taken as one row group. As illustrated in FIG. 7, the voltage source may input a primary detecting driving signal to the first row and the second row in the first period, and input a subsidiary detecting driving signal to the first row in the second period, input a primary detecting driving signal to the third row and the fourth row in the third period, and input a subsidiary detecting driving signal to the third row in the fourth period, . . . , input a primary detecting driving signal to the (N−1)th row and the Nth row in the (N−1)th period, and input a subsidiary detecting driving signal to the (N−1)th row in the Nth period, and so on, to perform touch detecting on the whole touch screen.

Figure 8:
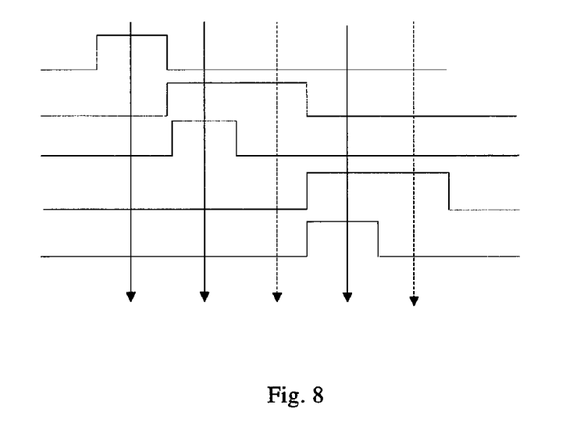
FIG. 8 is a sequence chart of driving signals of a touch detecting method according to another embodiment of the present invention, wherein each row group comprises different number of detecting rows.

FIG. 8 is a sequence chart of driving signals of a touch detecting method according to another embodiment of the present invention, wherein the number of the detecting rows in the row groups may be different. As illustrated in FIG. 8, the voltage source may input the primary detecting driving signal to the first row in the first period, and input the primary detecting driving signal to the second row and the third row in the second period, input a subsidiary driving signal to the second row in the third period, input the primary detecting driving signal to the fourth and fifth rows in the fourth period, and input the subsidiary detecting driving signal to the fourth row in the fifth period, and so on, to perform touch detecting on the whole touch screen.

Figure 9:
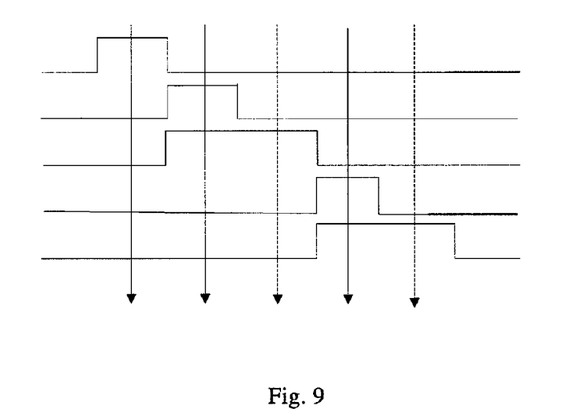
FIG. 9 is a sequence chart of driving signals of a touch detecting method according to another embodiment of the present invention, wherein each row group comprises different number of detecting rows.

FIG. 9 is a sequence chart of driving signals of a touch detecting method according to another embodiment of the present invention, wherein the number of the detecting rows in the row groups may be different. As illustrated in FIG. 9, the voltage source may input the primary detecting driving signal to the first row in the first period, and input the primary detecting driving signal to the second row and the third row in the second period, input a subsidiary driving signal to the third row in the third period, input the primary detecting driving signal to the fourth and fifth rows in the fourth period, and input the subsidiary detecting driving signal to the fifth row in the fifth period, and so on, to perform touch detecting on the whole touch screen.

In actual application, the touch detecting manners in the above described embodiments may be used to perform detecting on the touch screen, but the present invention is not limited thereto. To improve the precision of the detecting, the touch detecting manners in the above described embodiments may be combined in a pair.

In the above embodiments, the touch detecting may be divided into two detecting stages of the primary detecting and the subsidiary detecting (auxiliary detecting); in the primary detecting stage, the primary detecting is sequentially performed on detecting rows in each row group, wherein the touch detecting is performed synchronously on the pixel points located at the same pixel column in the same row group; in the subsidiary detecting stage, if there is a pixel column existing touch feedback in any row group, then sequentially perform touch detecting on the pixel points in selected detecting row in the pixel column, to determine the touched pixel point. In this way, it reduces the times of touch detecting and total time, and solves problems of responding slowly, halting, or not responding caused by too many touch detecting times in the prior art.

Figure 10:
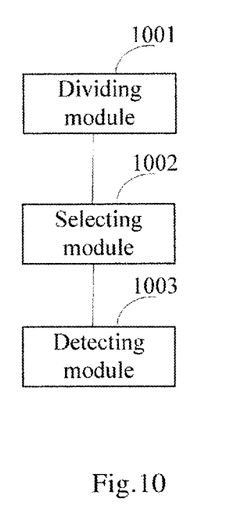
FIG. 10 is a schematic view of a touch detecting apparatus according to another embodiment of the present invention.

An embodiment of the present invention further provides a touch detecting apparatus, and as illustrated in FIG. 10, the touch detecting apparatus may comprise: a division module 1001, configured to divide a plurality of detecting rows in a touch screen into row groups; a selecting module 1002, configured to select detecting row from each row group; a detecting module 1003, configured to perform touch detecting on pixel points in each detecting row in each row group, wherein the touch detecting on the pixel points in the same pixel column in the same row group is performed synchronously; when it is detected a pixel column having touch feedback in any row group, a subsidiary touch detecting is performed on the pixel points in the selected detecting row in the above pixel column, to determine the pixel point being touched.

The above detecting module 1003 may be particularly used to:

if the number of the selected detecting row of the above any row group is 1, in a preset time length after inputting driving signals to each detecting row in the above any row group, inputting the driving signal to the selected detecting row of the above any row group; if the number of the selected detecting row of the above any row group is greater than 1, in a preset time length after inputting driving signals to each detecting row in the above any row group, sequentially inputting the driving signals to the selected detecting rows of the above any row group; and performing touch detecting on the pixel points in the selected detecting row having received the driving signal in the above pixel column.

Alternatively, the ratio of the time length, during which driving signals are inputted to each detecting row in the above any row group, and the preset time length may be the same as the number of the selected detecting rows in the above any row group.

The above detecting module 1003 may further be used to: when it is determined that there exist touch feedback at a pixel point in any selected detecting row in the above pixel column, the above pixel point is determined as the touched pixel point; when it is determined that there does not exist touch feed back at a pixel point in any selected detecting row in the above pixel column or there do not exist selected detecting row in the above any row group, the pixel point located in the non-selected detecting row of the above pixel column in the above any row group is determined as the touched pixel point.

In the above touch detecting apparatus, the detecting module 1003 may use any one of the following manners to perform touch detecting: resistance type touch detecting manner, capacitance type touch detecting manner, infrared touch detecting manner, sound surface wave touch detecting manner, and electromagnetic touch detecting manner.

The above touch detecting apparatus may correspond to the procedure of the above touch detecting method one by one, and the repeated description is not given here.

In the embodiments of the present invention, a row group division is performed on a plurality of detecting rows in a touch screen, and the touch detecting is performed synchronously on the pixel points located in the same pixel column in each row group, and when it is determined that there is a pixel column existing touch feedback in a certain row group, a touch detecting is performed on pixel points in the selected detecting row in the pixel column, so as to determine the pixel point being touched. Compared with performing touch detecting sequentially on each pixel point in the conventional method, it reduces detecting times, effectively lowers the requirement on calculating speed of the processor of the touch screen, shortens the total time of touch detecting, improves responding speed, and solves problems of responding slowly, halting, or not responding caused by too many touch detecting times.

Although the preferred embodiments of the present invention have been described, those skilled in the art may make additional changes and modifications on these embodiments once they know the basic creative conception. Thus, the appended claims are intended to comprise the preferred embodiments and all the changes and modifications which fall in the scope of the present invention.

It is obvious that those skilled in the art may make various changes and modifications on the embodiments of the present invention without departing the spirit and scope of the embodiments of the present invention. Thus, if these changes and modifications of the embodiments of the present invention belong to the scope of the claims of the present invention and equivalent technology, the present invention is intended to cover these changes and modifications.

What is claimed is:

1. A touch detecting method, comprising:
    Step S1: dividing a plurality of detecting rows in a touch screen into row groups;
    Step S2: determining a selected detecting row in each row group;
    Step S3: performing a primary touch detecting on pixel points in each detecting row in each row group, wherein in the primary touch detecting, the touch detecting on the pixel points in a same pixel column in a same row group is performed synchronously;
    Step S4: upon a pixel column having touch feedback is detected in any row group, performing a subsidiary touch detecting on the pixel points in the selected detecting row in the pixel column, to determine the pixel point being touched.

2. The method according to claim 1, wherein the step S3 comprises:
    inputting driving signals to each detecting row in each row group sequentially; and
    according to feedback information of the row groups which have received driving signals, performing touch detecting on pixel points in each detecting row of the row groups which have received driving signals.

3. The method according to claim 2, wherein the step S4 comprises:
    upon determining that there exist touch feedback at a pixel point in any selected detecting row in the above pixel column, the pixel point is determined as the touched pixel point;
    upon determining that there does not exist touch feedback at a pixel point in any selected detecting row in the above pixel column or there does not exist a selected detecting row in the any row group, the pixel point located in the non-selected detecting row of the above pixel column in the any row group is determined as the touched pixel point.

4. The method according to claim 1, wherein the subsidiary touch detecting performed in the step S4 comprises:
    upon a number of the selected detecting row of the any row group being 1, in a preset time length after inputting driving signals to each detecting row in the any row group, inputting the driving signal to the selected detecting row of the any row group and performing touch detecting on the pixel points in the selected detecting row in the pixel column;
    upon the number of the selected detecting row of the any row group being greater than 1, in a preset time length after inputting driving signals to each detecting row in the above any row group, sequentially inputting the driving signals to the selected detecting rows of the any row group and performing touch detecting on the pixel points in the selected detecting rows having received the driving signal in the pixel column.

5. The method according to claim 4, wherein a ratio of the time length during which driving signals are inputted to each detecting row in the any row group, and the preset time length is the same as the number of the selected detecting rows in the any row group.

6. The method according to claim 5, wherein the step S4 comprises:
    upon determining that there exist touch feedback at a pixel point in any selected detecting row in the above pixel column, the pixel point is determined as the touched pixel point;
    upon determining that there does not exist touch feedback at a pixel point in any selected detecting row in the above pixel column or there does not exist a selected detecting row in the any row group, the pixel point located in the non-selected detecting row of the above pixel column in the any row group is determined as the touched pixel point.

7. The method according to claim 4, wherein the step S4 comprises:
  upon determining that there exist touch feedback at a pixel point in any selected detecting row in the above pixel column, the pixel point is determined as the touched pixel point;
  upon determining that there does not exist touch feedback at a pixel point in any selected detecting row in the above pixel column or there does not exist a selected detecting row in the any row group, the pixel point located in the non-selected detecting row of the above pixel column in the any row group is determined as the touched pixel point.

8. The method according to claim 1, wherein the step S4 comprises:
  upon determining that there exist touch feedback at a pixel point in any selected detecting row in the above pixel column, the pixel point is determined as the touched pixel point;
  upon determining that there does not exist touch feedback at a pixel point in any selected detecting row in the above pixel column or there does not exist a selected detecting row in the any row group, the pixel point located in the non-selected detecting row of the above pixel column in the any row group is determined as the touched pixel point.

9. The method according to claim 1, wherein the touch detecting is performed on the pixel point by using any one of the following manners: resistance type touch detecting manner, capacitance type touch detecting manner, infrared touch detecting manner, sound surface wave touch detecting manner, and electromagnetic touch detecting manner.

10. A touch detecting apparatus, comprising:
  a dividing module, configured to divide a plurality of rows in the touch screen into row groups;
  a selecting module, configured to determine a selected detecting row in each row group; and
  a detecting module, configured to perform a primary touch detecting on pixel points in each detecting row in each row group, wherein the touch detecting on the pixel points in a same pixel column in a same row group is performed synchronously; upon there being a pixel column existing touch feedback in any row group, performing a subsidiary touch detecting on the pixel points in the selected detecting row in the pixel column, to determine the pixel point being touched.

11. The apparatus according to claim 10, wherein the primary touch detecting performed by the detecting module comprises:
  inputting driving signals to each detecting row in each row group sequentially; and
  according to feedback information of the row groups which have received driving signals, performing touch detecting on pixel points in each detecting row of the row groups which have received driving signals.

12. The apparatus according to claim 11, wherein the subsidiary touch detecting performed by the detecting module comprises:
  upon a number of the selected detecting row of the any row group being 1, in a preset time length after inputting driving signals to each detecting row in the any row group, inputting the driving signal to the selected detecting row of the any row group and performing touch detecting on the selected detecting row having received the driving signal in the pixel column;
  upon the number of the selected detecting rows of the any row group being greater than 1, in a preset time length after inputting driving signals to each detecting row in the any row group, sequentially inputting the driving signals to the selected detecting rows of the any row group and performing touch detecting on the pixel points in the selected detecting row having received the driving signal in the pixel column.

13. The apparatus according to claim 12, wherein a ratio of the time length during which driving signals are inputted to each detecting row in the any row group, and the preset time length is the same as the number of the selected detecting rows in the any row group.

14. The apparatus according to claim 13, wherein:
  upon determining that there exist touch feedback at a pixel point in any selected detecting row in the above pixel column, the pixel point is determined as the touched pixel point;
  upon determining that there does not exist touch feedback at a pixel point in any selected detecting row in the above pixel column or there does not exist a selected detecting row in the any row group, the pixel point located in the non-selected detecting row of the pixel column in the any row group is determined as the touched pixel point.

15. The apparatus according to claim 12, wherein:
  upon determining that there exist touch feedback at a pixel point in any selected detecting row in the above pixel column, the pixel point is determined as the touched pixel point;
  upon determining that there does not exist touch feedback at a pixel point in any selected detecting row in the above pixel column or there does not exist a selected detecting row in the any row group, the pixel point located in the non-selected detecting row of the pixel column in the any row group is determined as the touched pixel point.

16. The apparatus according to claim 11, wherein:
  upon determining that there exist touch feedback at a pixel point in any selected detecting row in the above pixel column, the pixel point is determined as the touched pixel point;
  upon determining that there does not exist touch feedback at a pixel point in any selected detecting row in the above pixel column or there does not exist a selected detecting row in the any row group, the pixel point located in the non-selected detecting row of the pixel column in the any row group is determined as the touched pixel point.

17. The apparatus according to claim 10, wherein:
  upon determining that there exist touch feedback at a pixel point in any selected detecting row in the above pixel column, the pixel point is determined as the touched pixel point;
  upon determining that there does not exist touch feedback at a pixel point in any selected detecting row in the above pixel column or there does not exist a selected detecting row in the any row group, the pixel point located in the non-selected detecting row of the pixel column in the any row group is determined as the touched pixel point.

18. The apparatus according to claim 10, wherein the detecting module performs touch detecting on the pixel point by using any one of resistance type touch detecting manner, capacitance type touch detecting manner, infrared touch detecting manner, sound surface wave touch detecting manner, and electromagnetic touch detecting manner.

* * * * *